(12) United States Patent
Chen

(10) Patent No.: US 7,029,073 B2
(45) Date of Patent: Apr. 18, 2006

(54) LIGHTWEIGHT WHEEL RIM CONNECTED TO SPOKES AT TWO OPPOSITE SIDES THEREOF

(75) Inventor: Chao-Ying Chen, Tainan Hsien (TW)

(73) Assignee: Alex Global Technology, Inc., Tainan Hsien (TW)

( * ) Notice: Subject to any disclaimer, the term of this patent is extended or adjusted under 35 U.S.C. 154(b) by 156 days.

(21) Appl. No.: 10/847,410

(22) Filed: May 17, 2004

(65) Prior Publication Data

US 2005/0194835 A1    Sep. 8, 2005

(30) Foreign Application Priority Data

Mar. 4, 2004   (TW)   ............... 93105700 A

(51) Int. Cl.
*B60B 1/14*   (2006.01)
(52) U.S. Cl. .............. 301/58; 301/95.104; 301/95.107
(58) Field of Classification Search .............. 301/55, 301/58, 95.101, 95.104, 95.106, 95.107, 301/95.108
See application file for complete search history.

(56) References Cited

U.S. PATENT DOCUMENTS 6,367,883 B1 * 4/2002 Chen ........................... 301/55
6,425,641 B1 * 7/2002 Herting ....................... 301/58

FOREIGN PATENT DOCUMENTS

JP          60-12315       *  1/1985

* cited by examiner

*Primary Examiner*—Russell D. Stormer
(74) *Attorney, Agent, or Firm*—Whyte Hirschboeck Dudek SC

(57) ABSTRACT

A lightweight wheel rim includes a pair of annular side walls, an annular inner wall, and two annular angle elements. The angle elements are disposed respectively at two opposite sides of the inner wall. Each of the angle elements has two opposite sides that are formed respectively and integrally with the inner wall and a radial inner end of a corresponding one of the side walls, and a plurality of alternately arranged mounting portions and dented portions. Each of the mounting portions has a mounting hole for extension of a spoke unit therethrough.

5 Claims, 10 Drawing Sheets

US 7,029,073 B2

LIGHTWEIGHT WHEEL RIM CONNECTED TO SPOKES AT TWO OPPOSITE SIDES THEREOF

CROSS-REFERENCE TO RELATED APPLICATION

This application claims priority of Taiwanese Application No. 093105700, filed on Mar. 4, 2004.

BACKGROUND OF THE INVENTION

1. Field of the Invention

This invention relates to a wheel rim, and more particularly to a lightweight wheel rim that is connected to spokes at two opposite sides thereof.

2. Description of the Related Art

Referring to FIGS. 1 and 2, a conventional bicycle wheel rim 1 disclosed in U.S. Pat. No. 6,402,256 is shown to include a pair of left and right side walls 11 (only one is shown in FIG. 1), and annular inner and outer walls 12, 13 interconnecting the left and right side walls 11 and spaced apart from each other along a radial direction of the wheel rim 1. The inner wall 12 has a middle portion that is formed with a plurality of alternately arranged mounting holes 121 and dented portions 122. A plurality of steel spokes 14 are locked respectively within the mounting holes 121 in the inner wall 12. The dented portions 122 are thinner than the portions of the inner wall 12 defining the mounting holes 121. The outer wall 13 cooperates with the left and right sidewalls 11 to define a tire-mounting space 15 for supporting a tire (not shown).

Although the total weight of the wheel rim 1 can be reduced due to formation of the dented portions 122, the mounting holes 121 and the dented portions 122 are disposed at the middle portion of the inner wall 12, thereby resulting in a considerable decrease in the strength of the inner wall 12. As such, the portions of the inner wall 12 that define the mounting holes 121 are likely to deform due to the pulling force of the spokes 14.

SUMMARY OF THE INVENTION

The object of this invention is to provide a lightweight, high-strength wheel rim.

According to this invention, a lightweight wheel rim is adapted to be connected to a hub by a plurality of spoke units, each of which includes a steel rod and a steel locking head that are interconnected. The lightweight wheel rim includes a pair of annular left and right side walls each having a radial inner end, an annular inner wall disposed between the radial inner ends of the left and right side walls, and a pair of annular left and right angle elements. The left and right angle elements are disposed respectively at two opposite sides of the inner wall, and are formed integrally with the inner wall and the left and right side walls. Each of the left and right angle elements has two opposite sides formed respectively and integrally with the inner wall and a corresponding one of the left and right side walls, and a plurality of alternately arranged mounting portions and dented portions. Each of the mounting portions of the left and right angle elements has a mounting hole that is formed therethrough and that is adapted to mount a respective one of the locking heads therein. Each of the dented portions of the left angle element is dented toward the right side wall in a direction that is inclined relative to a radial direction of the hub. Each of the dented portions of the right angle element is dented toward the left side wall in a direction that is inclined relative to the radial direction of the hub. Each of the mounting holes in the left angle element is disposed between two adjacent ones of the mounting holes in the right angle element along a circumferential direction of the hub. Each of the dented portions of the left angle element is disposed between two adjacent ones of the dented portions of the right angle element along the circumferential direction of the hub.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
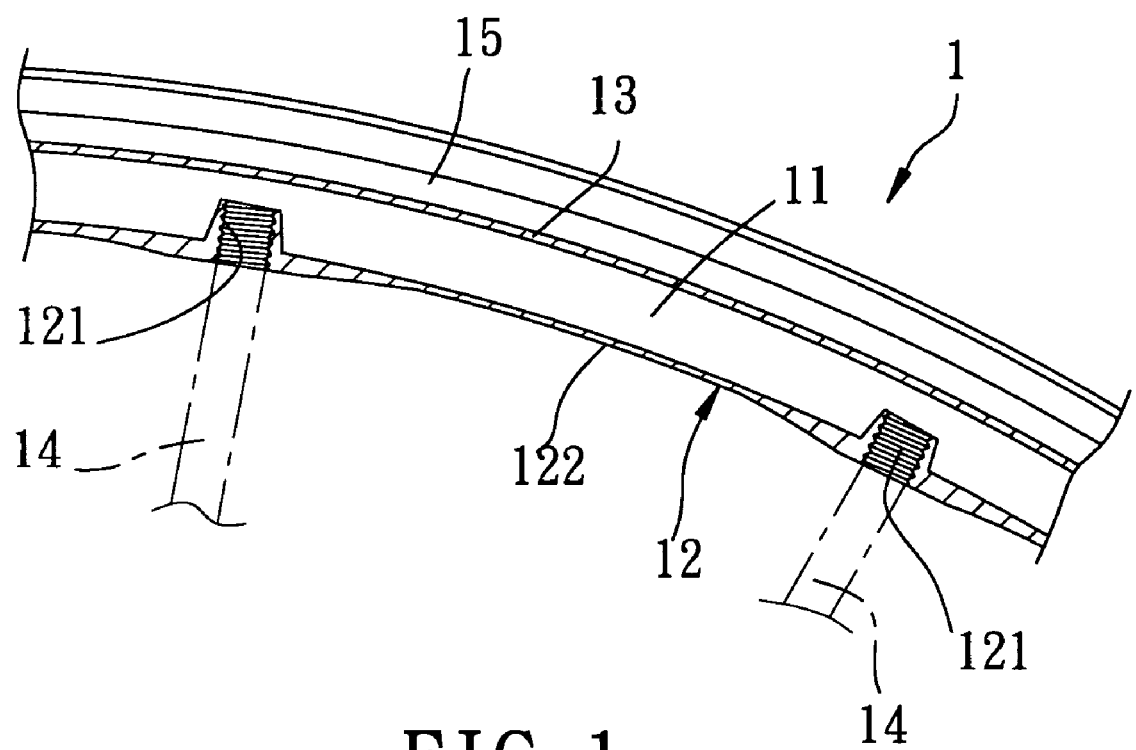
FIG. 1 is a fragmentary sectional view of a conventional bicycle wheel rim, which is disclosed in U.S. Pat. No. 6,402,256.
Figure 2:
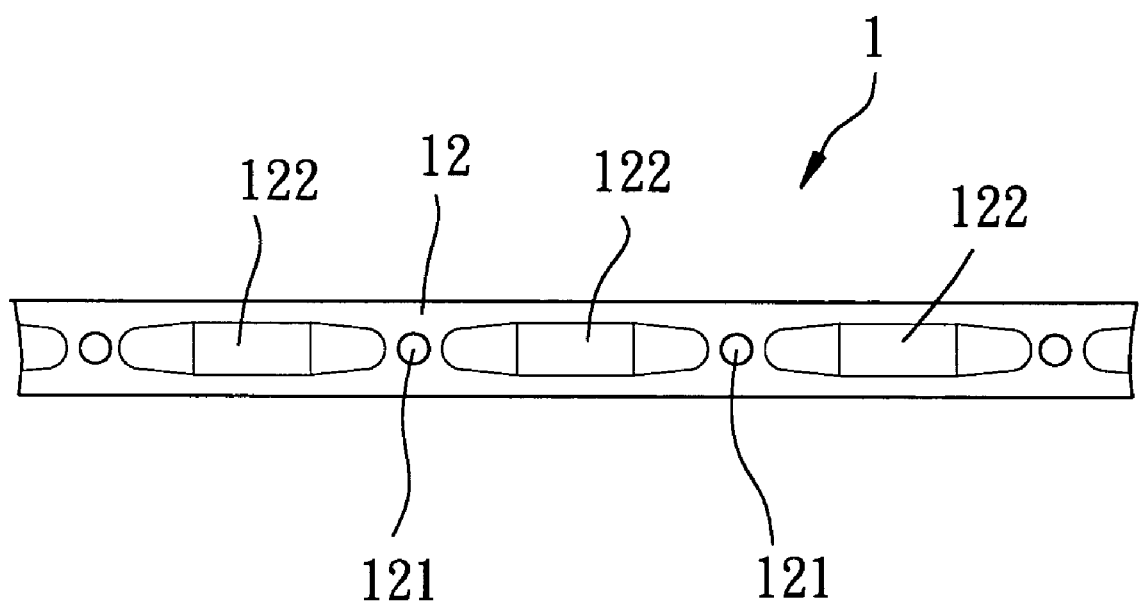
FIG. 2 is a fragmentary bottom view of the conventional bicycle wheel rim.

Before the present invention is described in greater detail in connection with the preferred embodiments, it should be noted that similar elements and structures are designated by like reference numerals throughout the entire disclosure.

Figure 3:
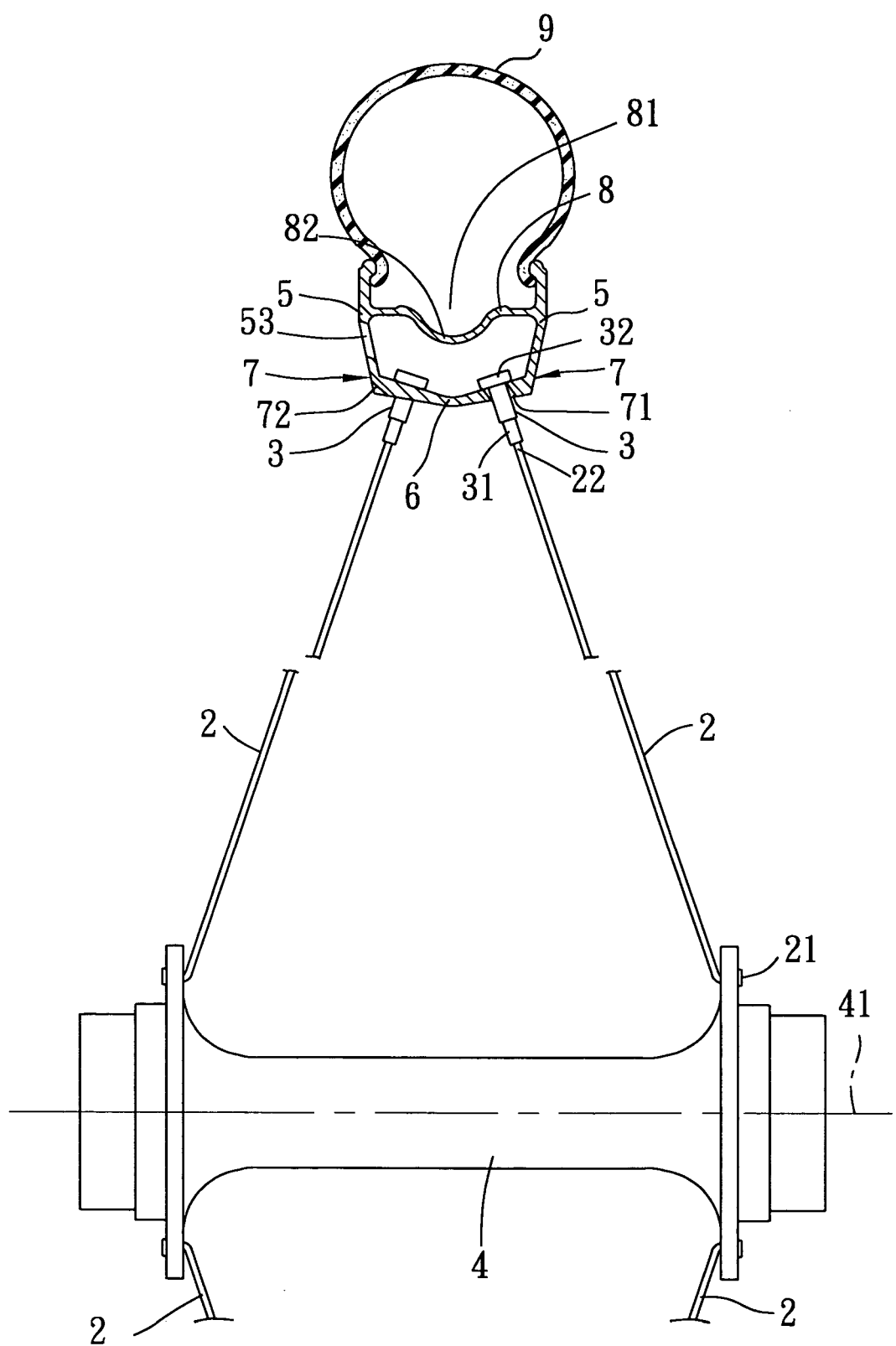
FIG. 3 is a sectional view of the first preferred embodiment of a wheel rim according to this invention, illustrating how the wheel rim is connected to a tire and a hub.
Figure 4:
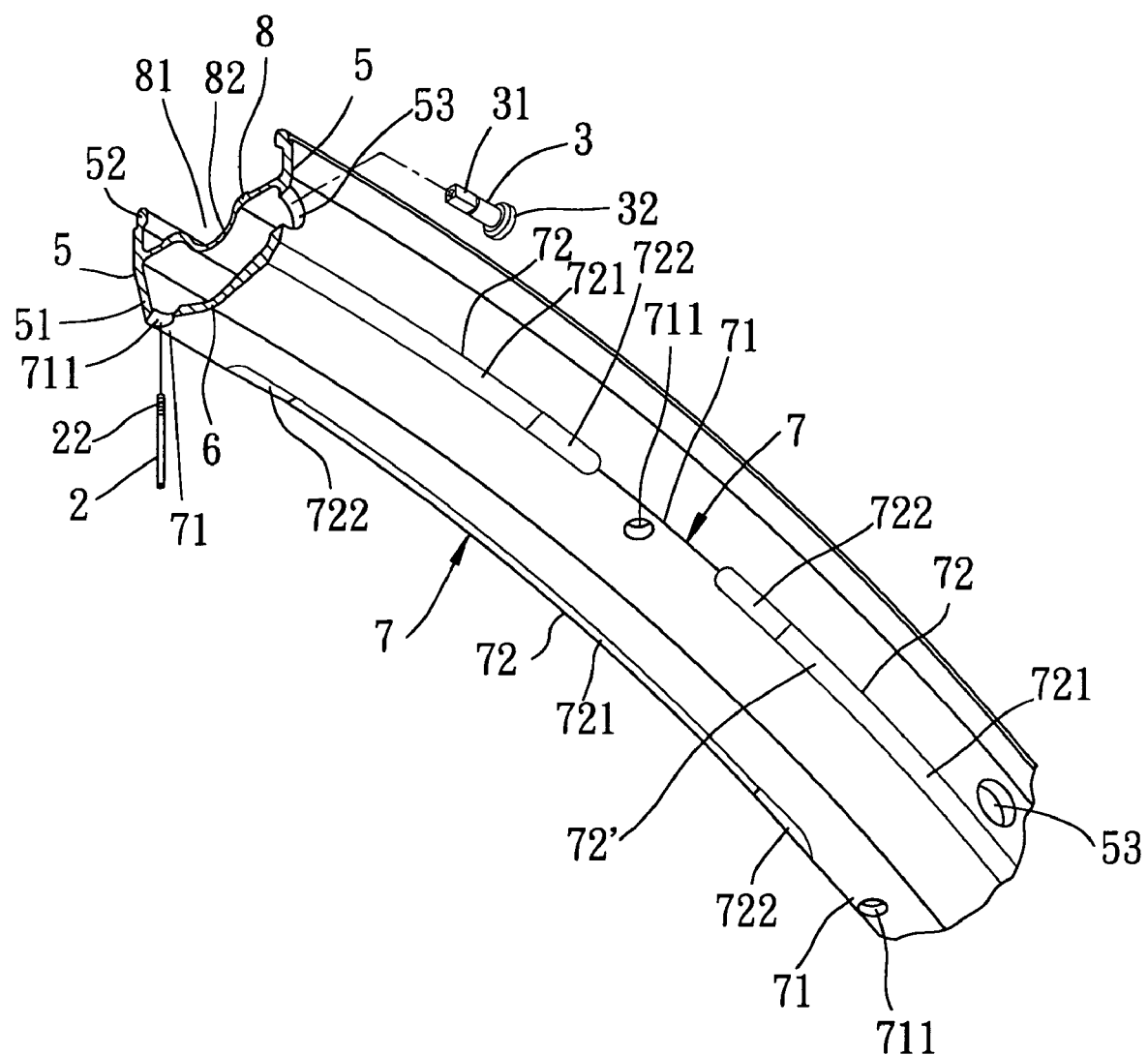
FIG. 4 is a fragmentary, partly sectional, perspective view of the first preferred embodiment.
Figure 5:
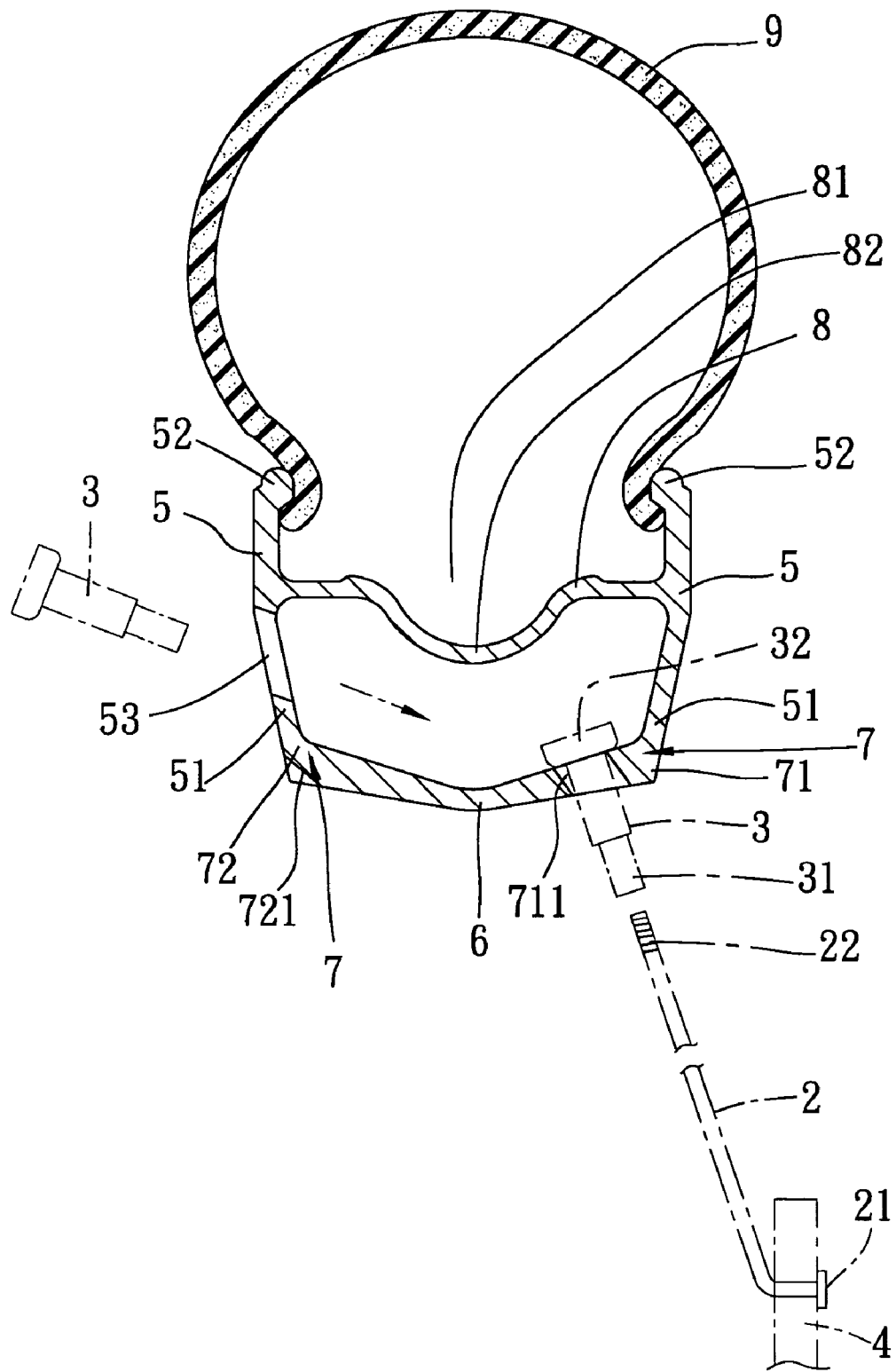
FIG. 5 is a sectional view of the first preferred embodiment, illustrating how a spoke unit is mounted to the wheel rim.

Referring to FIGS. 3, 4, and 5, the first preferred embodiment of a wheel rim according to this invention is connected to a hub 4 by a plurality of spoke units, each of which includes a steel rod 2 and a steel locking head 3. Each of the steel rods 2 has a hook end 21 connected to the hub 4, and an externally threaded end 22. Each of the locking heads 3 has an internally threaded end 31 engaging the externally threaded end 22 of the corresponding steel rod 2, and an outward flange 32 extending radially and outwardly therefrom. The wheel rim is made of metal, is unitary, and includes a pair of annular left and right side walls 5, an annular inner wall 6, a pair of annular left and right angle elements 7, and an annular outer wall 8.

The left and right side walls 5 are disposed around a central axis 41 of the hub 4. Each of the left and right side walls 5 has a radial inner end 51, a radial outer end 52, and a plurality of side holes 53 formed therethrough. Each of the side holes 53 has a diameter larger than the maximum diameter of the locking heads 3 so as to permit the same to be inserted therethrough. Each of the side holes 53 in the left side wall 5 is disposed between two adjacent ones of the side holes 53 in the right side wall 5 along a circumferential direction of the hub 4.

The inner wall 6 is disposed between the radial inner ends 51 of the left and right side walls 5.

The left and right angle elements 7 are disposed respectively at two opposite sides of the inner wall 6, and is formed integrally with the inner wall 6 and the left and right side walls 5. Each of the left and right angle elements 7 has two opposite sides formed respectively and integrally with the inner wall 6 and the radial inner end 51 of a corresponding one of the left and right side walls 5, and a plurality of alternately arranged mounting portions 71 and dented portions 72. The dented portions 72 are thinner than the mounting portions 71. The left and right angle elements 7 are thicker than the inner wall 6 at the mounting portions 71.

Each of the mounting portions 71 of the left and right angle elements 7 has a mounting hole 711 that is formed therethrough, that extends along a direction which is inclined relative to the radial direction of the hub 4, and that is adapted to mount the corresponding locking head 3 therein. Each of the side holes 53 in the left side wall 5 extends toward a respective one of the mounting holes 711 in the right angle element 7 along a direction that is inclined relative to the radial direction of the hub 4. Each of the side holes 53 in the right side wall 5 extends toward a respective one of the mounting holes 711 in the left angle element 7 along a direction that is inclined relative to the radial direction of the hub 4. Each of the mounting holes 711 in the left and right angle elements 7 has a diameter that is larger than those of the internally threaded ends 31 of the locking heads 3 and that is smaller than those of the outward flanges 32 of the locking heads 3. As such, the locking heads 3 can be clamped by a tool (not shown) to move respectively into the mounting holes 711 in the left and right angle elements 7 through the side holes 53 in the left and right side walls 5, as shown in FIG. 5. Each of the mounting holes 711 in the left angle element 7 is disposed between two adjacent ones of the mounting holes 711 in the right angle element 7 along the circumferential direction of the hub 4.

Each of the dented portions 72 of the left and right angle elements 7 extends along the circumferential direction of the hub 4. Each of the dented portions 72 of the left angle element 7 is dented toward the radial outer end 52 of the right side wall 5 in a direction that is inclined relative to the radial direction of the hub 4. Each of the dented portions 72 of the right angle element 7 is dented toward the radial outer end 52 of the left side wall 5 in a direction that is inclined relative to the radial direction of the hub 4.

Each of the indented portions 72 of the left and right angle elements 7 has a flat middle portion 721 and two curved ends 722 that cooperate with the flat middle portion 721 to define an outer slot 72' (see FIG. 4) in an outer surface of a corresponding one of the left and right angle elements 5 and that have a thickness which increases in a direction away from the flat middle portion 721.

The outer wall 8 has two opposite sides that are formed respectively and integrally with the left and right side walls 5 at locations between the radial inner ends 51 and the radial outer ends 52 of the left and right side walls to define a U-shaped cross-sectioned tire mounting space 81 among the outer wall 8 and the radial outer ends 52 of the left and right side walls 5. The mounting space 81 is adapted to mount a tire 9 therein.

Some of the advantages of the wheel rim of this invention can be summarized as follows:

(1) Because the mounting portions 71 of the left and right angle elements 7 are disposed between the inner wall 6 and the left and right side walls 5 and are thicker than the inner wall 6, they have relatively large tensile strengths. Furthermore, because each of the mounting portions 71 of the left angle element 7 is disposed between two adjacent ones of the mounting portions 71 of the right angle element 7 along the circumferential direction of the hub 4, the tensile strengths of the mounting portions 71 are further increased. As such, deformation of the mounting portions 71 of the left and right angle elements 7 resulting from the pulling force of the spoke units can be prevented, thereby increasing the service life of the wheel rim.

(2) The formation of the dented portions 72 of the angle elements 7 results in a considerable decrease in the total weight of the wheel rim.

Figure 6:
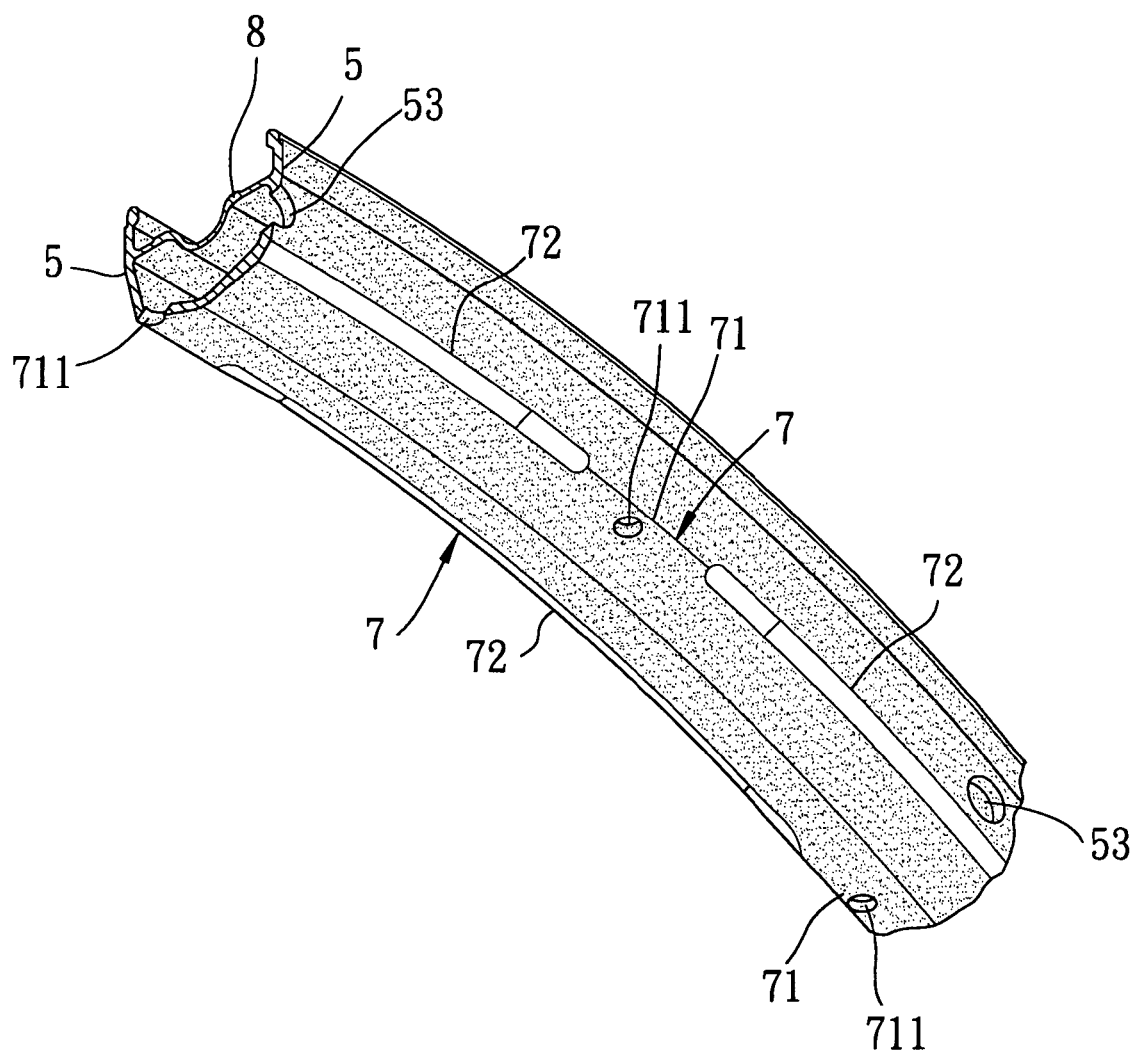
FIG. 6 is a fragmentary, partly sectional, perspective view of the first preferred embodiment, illustrating how a plurality of dented portions are formed in the wheel rim to provide an appealing visual effect.

(3) Referring to FIG. 6, the wheel rim is made of an aluminum alloy having a silvery white color, and is plated with a black coating. As such, the black coating is interspersed with a plurality of slivery white dented portions 72 of the angle elements 7 that are arranged along the circumferential direction of the hub 4 (see FIG. 3), thereby providing an appealing visual effect.

Figure 7:
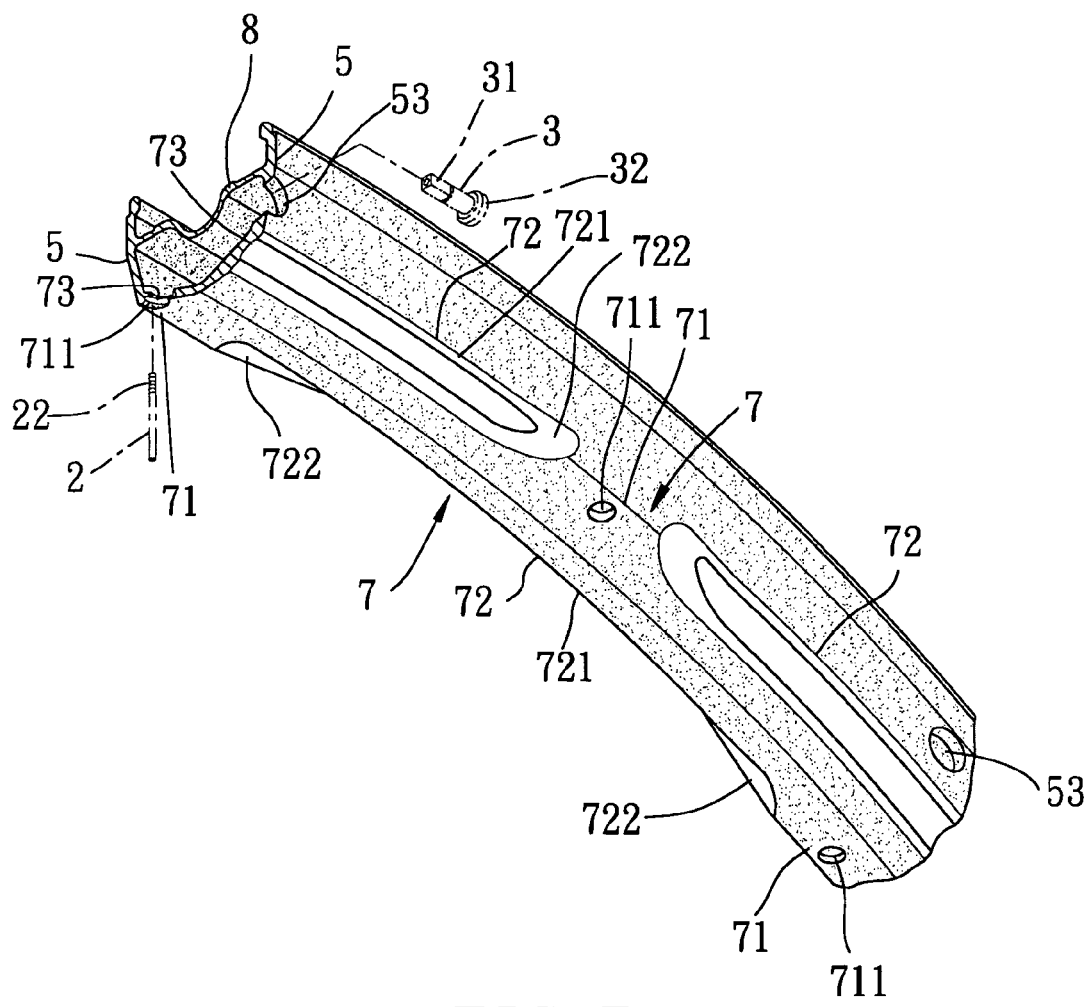
FIG. 7 is a fragmentary, partly sectional, perspective view of the second preferred embodiment of a wheel rim according to this invention.
Figure 8:
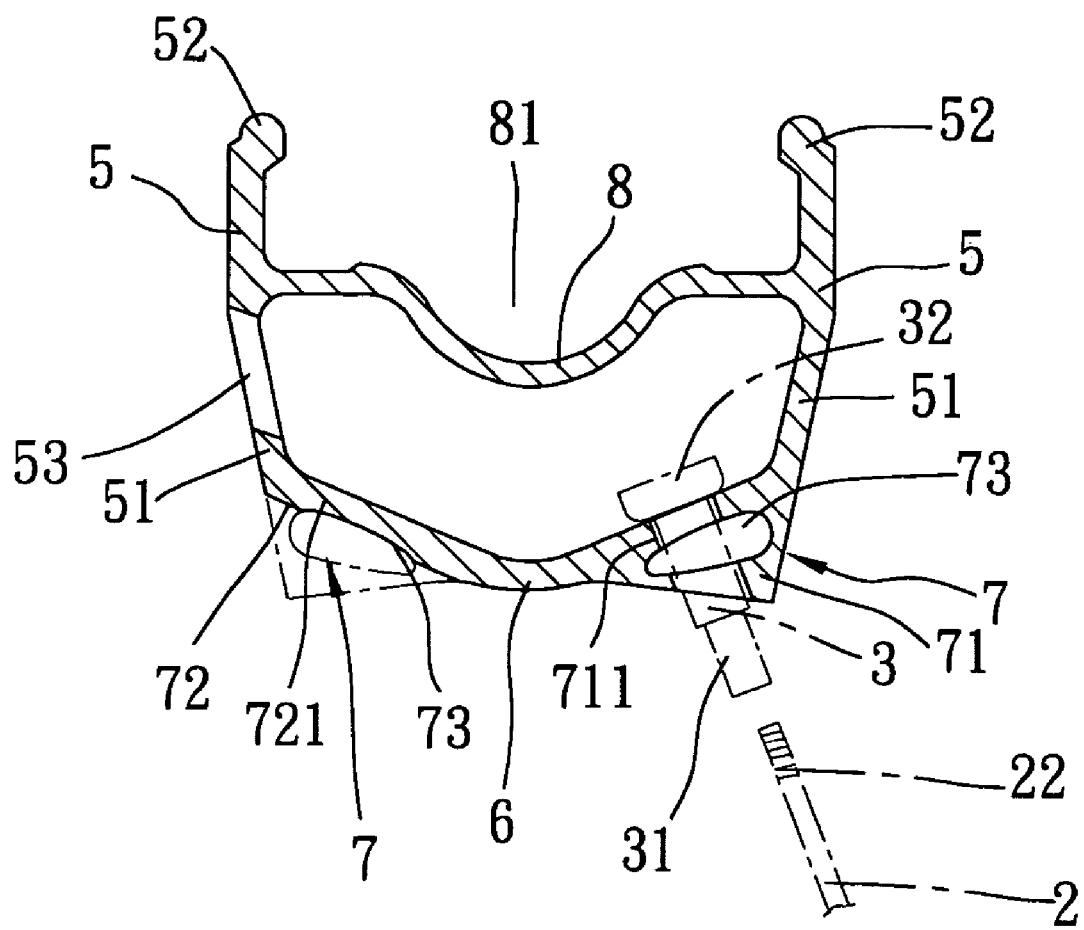
FIG. 8 is a sectional view of the second preferred embodiment, illustrating how a spoke unit is mounted to the wheel rim.
Figure 9:
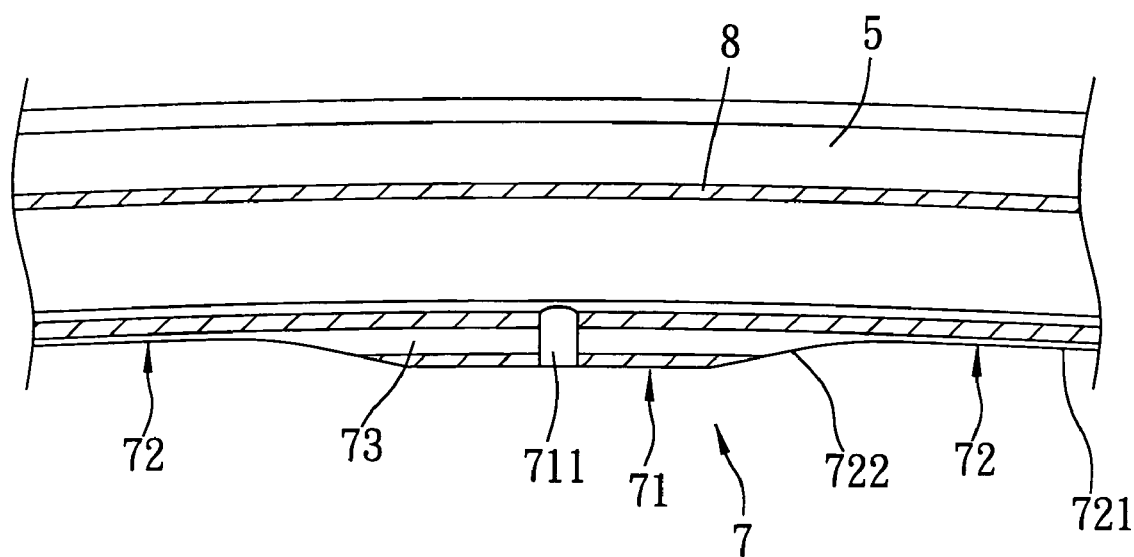
FIG. 9 is a fragmentary sectional view of the second preferred embodiment.
Figure 10:
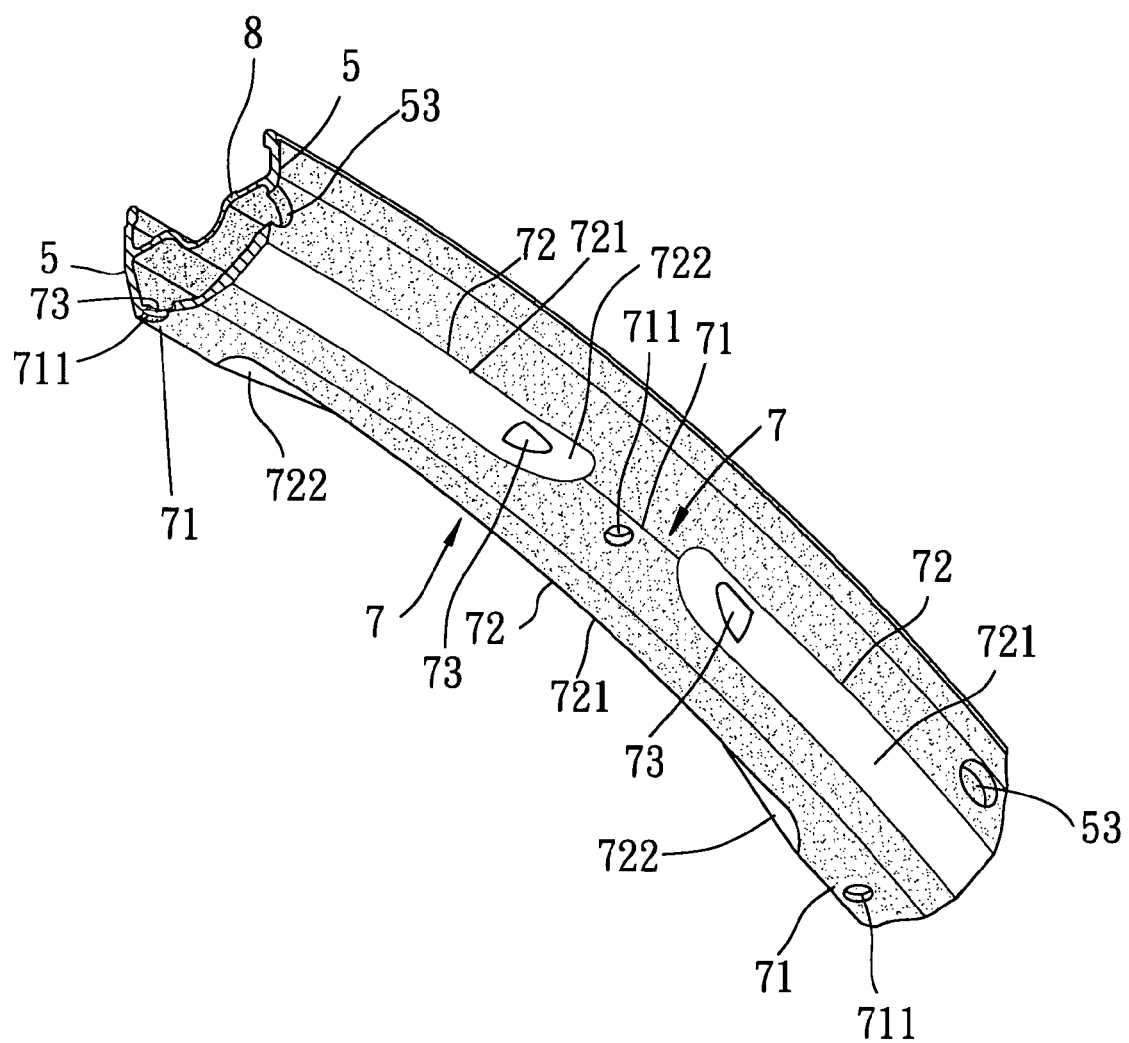
FIG. 10 is a fragmentary, partly sectional, perspective view of the third preferred embodiment of a wheel rim according to this invention.

FIGS. 7, 8, and 9 show the second preferred embodiment of a wheel rim according to this invention, which includes modified left and right angle elements 7. Each of the modified left and right angle elements 7 further has an annular inner slot 73 that is formed therethrough along the circumferential direction of the hub 4 (see FIG. 3) and that is communicated with the mounting holes 711 and the outer slots 72' (see FIG. 4). The inner slots 73 are communicated with the outer slots (see FIG. 4) at the flat middle portions 721 and the curved ends 722 of the dented portions 72 of the angle elements 7. Alternatively, the inner slots 73 may be communicated with the outer slots (see FIG. 4) at only the curved ends 722 of the dented portions 72 of the angle elements 7, as shown in FIG. 10. As such, the total weight of the wheel rim is further increased.

With this invention thus explained, it is apparent that numerous modifications and variations can be made without departing from the scope and spirit of this invention. It is therefore intended that this invention be limited only as indicated by the appended claims.

I claim:

1. A lightweight wheel rim adapted to be connected to a hub by a plurality of spoke units, each of which includes a steel rod and a steel locking head that are interconnected, said lightweight wheel rim comprising:
   a pair of annular left and right side walls, each of which has a radial inner end;
   an annular inner wall disposed between said radial inner ends of said left and right side walls; and
   a pair of annular left and right angle elements disposed respectively at two opposite sides of said inner wall and formed integrally with said inner wall and said left and right side walls, each of said left and right angle elements having two opposite sides formed respectively and integrally with said inner wall and said radial inner end of a corresponding one of said left and right side walls, and a plurality of alternately arranged mounting portions and dented portions, each of said mounting portions of said left and right angle elements having a mounting hole that is formed therethrough and that is adapted to mount a respective one of the locking heads therein, each of said dented portions of said left angle element being dented toward said right side wall in a direction that is inclined relative to a radial direction of the hub, each of said dented portions of said right angle element being dented toward said left side wall in a direction that is inclined relative to the radial direction of the hub, each of said mounting holes in said left angle element being disposed between two adjacent ones of said mounting holes in said right angle element along a circumferential direction of the hub.

2. The lightweight wheel rim as claimed in claim 1, wherein each of said dented portions of said left and right angle elements has a flat middle portion and two curved ends that cooperate with said flat middle portion to define an outer slot in an outer surface of a corresponding one of said left and right angle elements and that have a thickness which increases in a direction away from said flat middle portion.

3. The lightweight wheel rim as claimed in claim 2, wherein each of said left and right angle elements further has an annular inner slot that is formed therethrough along the circumferential direction of the hub and that is communicated with said mounting holes and said outer slots.

4. The lightweight wheel rim as claimed in claim 1, wherein said left and right angle elements are thicker than said inner wall at said mounting portions.

5. The lightweight wheel rim as claimed in claim 1, wherein each of said left and right side walls further has a radial outer end, said wheel rim further comprising an annular outer wall having two opposite sides that are formed respectively and integrally with said left and right side walls at locations between said radial inner ends and said radial outer ends of said left and right side walls to define a U-shaped cross-sectioned tire mounting space among said outer wall and said radial outer ends of said left and right side walls, said mounting space being adapted to mount a tire therein.

\* \* \* \* \*